(12) United States Patent
Medapalli et al.

(10) Patent No.: US 10,972,973 B2
(45) Date of Patent: Apr. 6, 2021

(54) ENERGY-EFFICIENT IDLE LISTENING SCHEMES

(71) Applicant: Cypress Semiconductor Corporation, San Jose, CA (US)

(72) Inventors: Kamesh Medapalli, San Jose, CA (US); Rajendra Kumar Gundu Rao, Bangalore (IN); Xianmin Wang, Westfield, NJ (US); Sangho Seo, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/591,428

(22) Filed: Oct. 2, 2019

(65) Prior Publication Data

US 2020/0187114 A1 Jun. 11, 2020

Related U.S. Application Data (63) Continuation of application No. 16/215,152, filed on Dec. 10, 2018, now Pat. No. 10,470,121.

(51) Int. Cl.
*H04W 52/02* (2009.01)
*H04W 72/04* (2009.01)
*H04W 84/12* (2009.01)

(52) U.S. Cl.
CPC ... *H04W 52/0206* (2013.01); *H04W 52/0229* (2013.01); *H04W 72/0446* (2013.01); *H04W 84/12* (2013.01)

(58) Field of Classification Search
CPC ......... H04W 52/0206; H04W 52/0229; H04W 84/12; H04W 72/0446
See application file for complete search history.

(56) References Cited

U.S. PATENT DOCUMENTS 8,126,502 B2 * 2/2012 Trainin ............... H04W 16/14
455/552.1
8,432,930 B2 * 4/2013 Lee .................... H04L 47/70
370/444

(Continued)

FOREIGN PATENT DOCUMENTS

| CN | 105191476 A | 12/2015 |
| CN | 105580487 A | 5/2016 |
| CN | 106664178 A | 5/2017 |

OTHER PUBLICATIONS

USPTO Non Final Rejection for U.S. Appl. No. 16/215,152 dated Mar. 28, 2019; 18 pages.

(Continued)

*Primary Examiner* — Rasheed Gidado (57) ABSTRACT

Two methods for energy-efficient idle listening enhancement for WLAN systems are provided. The first method performs a change of operation of a station (STA) from an active mode to an idle listening mode without notifying the change to an access point (AP) associated with the STA. In the idle listening mode, the AP may transmit frames to the STA using a higher bandwidth, but the STA can only sense channels in a lower bandwidth to save energy. The second method transmits a frame to the AP associated with the STA to notify the AP the change of operation of the STA from the active mode to the idle listening mode. In the idle listening mode, the AP may transmit frames to the STA using the lower bandwidth, and the STA can only sense channels in the lower bandwidth to save energy.

20 Claims, 5 Drawing Sheets

(56) References Cited

U.S. PATENT DOCUMENTS

| | | | |
|---|---|---|---|
| 8,526,349 B2* | 9/2013 | Fischer | H04W 74/0816 |
| | | | 370/312 |
| 8,654,787 B2* | 2/2014 | Barreto | H04L 67/2876 |
| | | | 370/466 |
| 9,055,512 B2* | 6/2015 | Pikkarainen | H04W 48/08 |
| 10,397,864 B2* | 8/2019 | Sambhwani | H04W 52/0216 |
| 2012/0082040 A1* | 4/2012 | Gong | H04L 5/0062 |
| | | | 370/252 |
| 2013/0244666 A1* | 9/2013 | Carmon | H04W 36/165 |
| | | | 455/438 |
| 2014/0369303 A1 | 12/2014 | Gong et al. | |
| 2015/0358877 A1* | 12/2015 | Wei | H04W 36/0072 |
| | | | 370/331 |
| 2018/0295607 A1* | 10/2018 | Lindoff | H04W 28/20 |

OTHER PUBLICATIONS

USPTO Notice of Allowance for U.S. Appl. No. 16/215,152 dated Jul. 3, 2019; 7 pages.

SIPO Office Action for Application No. 201911238214.1 dated Aug. 31, 2020; 6 pages.

\* cited by examiner

ENERGY-EFFICIENT IDLE LISTENING SCHEMES

This Application is a Continuation of U.S. patent application Ser. No. 16/215,152, filed on Dec. 10, 2018, which is incorporated by reference herein.

TECHNICAL FIELD

Aspects of the present disclosure generally relate to wireless local area network (WLAN) systems, and more particularly, to energy-efficient idle listening schemes for WLAN systems.

BACKGROUND

IEEE 802.11ac standard can provide high throughput wireless local area networks (WLANs) on the 5 GHz frequency band. IEEE 802.11ac standard specifies 80 MHz and 40 MHz operations for very high throughput (VHT) and high throughput (HT) stations (STAs), respectively. When an STA is associated with an access point (AP) operated in the 80 MHz bandwidth, the STA normally has to sense channels across the entire 80 MHz bandwidth if the STA is a VHT STA. If the STA is a HT STA, it normally has to sense channels across the primary 40 MHz channel. Sensing channels across the entire 80 MHz bandwidth or the primary 40 MHz channel often leads to elevated power consumption on the STA. This is partly because the system on chip (SoC) on the STA may constantly run in high-frequency operations.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As described above, under the IEEE 802.11ac standard, when a station (STA) is associated with an access point (AP) operated in the 80 MHz bandwidth, the STA normally has to sense channels across the entire 80 MHz bandwidth if the STA is a very high throughput (VHT) STA. If the STA is a high throughput (HT) STA, it normally has to sense channels across the primary 40 MHz channel. Sensing channels across the entire 80 MHz bandwidth or the primary 40 MHz channel often leads to elevated power consumption on the STA as compared to sensing the primary 20 MHz channel. Energy efficiency of the STA can be improved if the carrier or channel sensing requirement is relaxed. With the relaxed channel sensing requirement, the STA only needs to sense one or more channels across a lower bandwidth such as the primary 20 MHz bandwidth in the 5 GHz frequency band (herein also referred to as "minimum BW"). Also, the STA can switch to operate on a higher bandwidth such as the 80 MHz or 40 MHz bandwidth in the 5 GHz frequency band (herein also referred to as "full BW") only when necessary.

The examples, implementations, and embodiments described herein can change operation of an STA from an active mode with a higher bandwidth (e.g., the full BW) to an idle listening mode with a lower bandwidth (e.g., the minimum BW) to save energy of the STA.

Figure 1:
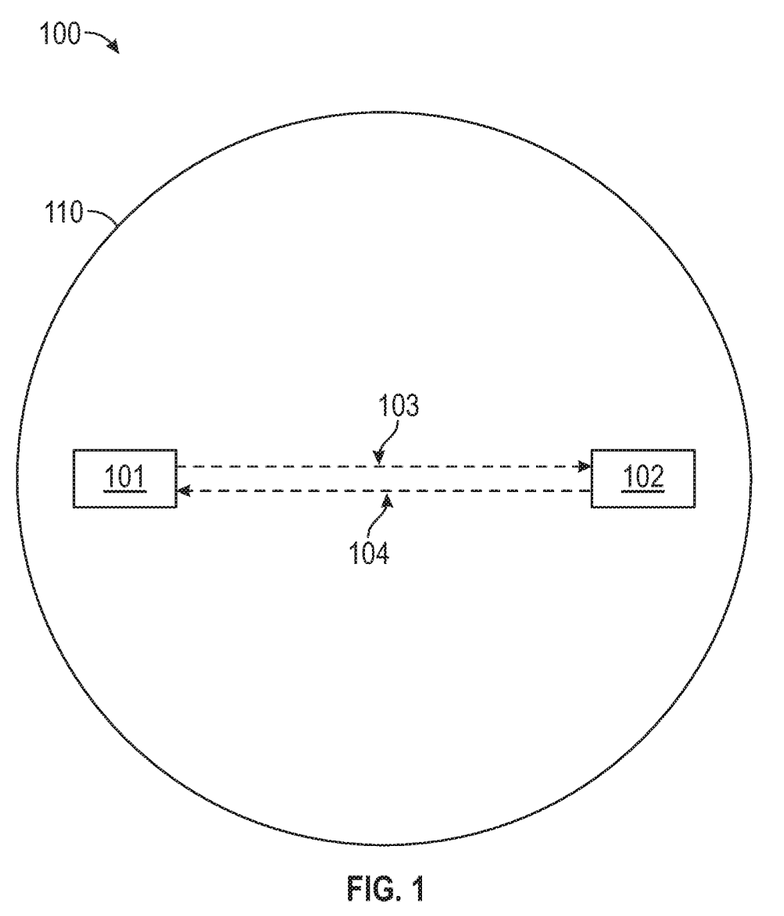
FIG. 1 illustrates an example wireless local area network (WLAN) architecture, in accordance with some embodiments of the present disclosure.

FIG. 1 illustrates an example wireless local area network (WLAN) architecture 100, in accordance with some embodiments of the present disclosure. As shown in FIG. 1, the network architecture 100 may include an STA 101 and an AP 102. The STA 101 is associated with the AP 102. The STA 101 can transmit wireless radio-frequency (RF) signals carrying data packets (or data messages, frames, etc.) to the AP 102, as indicated by arrow 103. Similarly, the AP 102 can transmit wireless RF signals carrying data packets (or data messages, frames, etc.) to the STA 101, as indicated by arrow 104. The circle 110 illustrated in FIG. 1 may represent the range of the RF signals transmitted between the STA 101 and the AP 102. When the STA 101 and the AP 102 are located within the circle 110, data can be transmitted wirelessly between the STA 101 and the AP 102. The STA 101 may be a device that can access the WLAN such as a mobile device or a computer.

Examples, implementations, and embodiments described herein are primarily described in the context of a WLAN network. In one embodiment, the WLAN architecture 100 may be a WLAN network using IEEE 802.11ac standard. In other embodiments, the WLAN architecture 100 may be a WLAN network using other standards such as IEEE 802.11m standard.

Figure 2:
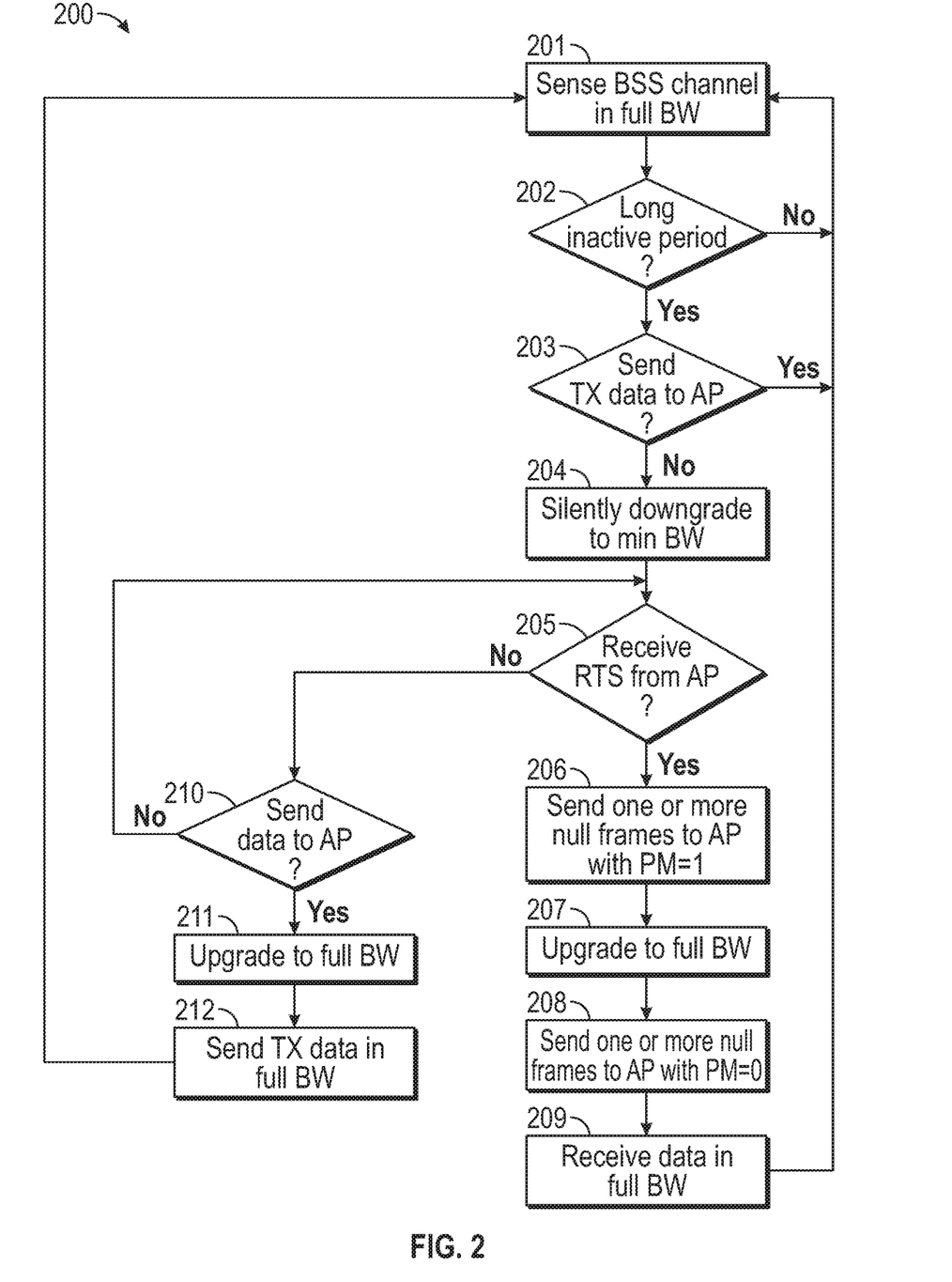
FIG. 2 illustrates an example process of an asynchronous energy-efficient idle listening scheme, in accordance with some embodiments of the present disclosure.

FIG. 2 illustrates an example process 200 of an asynchronous energy-efficient idle listening scheme, in accordance with some embodiments of the present disclosure. In the asynchronous energy-efficient idle listening scheme, the AP 102 and the STA 101 can communicate data while operating in different modes (i.e., asynchronous modes).

In one embodiment, at block 201, the STA 101 joins a basic service set (BSS). A BSS may be a single AP (e.g., the AP 102) with all associated STAs such as the STA 101 and/or other STAs associated with the AP 102. In one embodiment, the STA 101 may join the BSS and sense the BSS in full BW. For example, under IEEE 802.11ac, the STA 101 can join the BSS and operate in an active mode with 80 MHz bandwidth.

At block 202, the STA 101 detects whether there is a long inactive period. In one embodiment, the inactive period can be a predetermined time duration. For example, the STA 101 may detect that there was no data transmitted to the AP 102 and/or no data received from the AP 102 for the predetermined time duration. That is, the link between the STA 101 and the AP 102 is inactive for a predetermined time duration. In another example, the inactive period can be detected based on number or type of packets transmitted between the STA 101 and the AP 102 for a predetermined duration of time. For example, when the STA 101 detects that the number of packets was below a threshold or the packets have a specific type, the STA 101 can determine that the link between the STA 101 and the AP 102 is inactive.

In one embodiment, if the STA 101 does not detect the inactive period, the process 200 goes back to block 201 where the STA 101 continues to sense the BSS in full BW. On the other hand, if the STA 101 detects the inactive period, the process 200 proceeds to block 203. In one embodiment, at block 203, the STA 101 detects whether there is transmission data (TX data) scheduled to be transmitted to the AP 102. If the STA 101 detects that there is TX data to be transmitted to the AP 102, the STA 101 may transmit the TX data to the AP 102, and the process 200 goes back to block 201 where the STA 101 continues to sense the BSS in full BW. On the other hand, if the STA 101 detects that there is no TX data to be transmitted to the AP 102, the process 200 proceeds to block 204.

In one embodiment, at block 204, the STA 101 performs a change or downgrade of operation mode to save energy. In one embodiment, the STA 101 may silently initiate and subsequently perform downgrade of its operation mode on physical (PHY) layer and RF from the active mode with a higher bandwidth (e.g., the full BW) to an idle listening mode with a lower bandwidth (e.g., the minimum BW). For example, under IEEE 802.11ac, the STA 101 can change its operation mode from the active mode with 80 MHz to the idle listening mode with 20 MHz bandwidth. In one embodiment, the STA 101 does not send a notification to the AP 102 in any form regarding the operation mode change to avoid additional protocol cost, i.e., the STA 101 silently performs downgrade of its operation mode.

In one embodiment, when performing the change or downgrade of operation mode to save energy, the STA 101 can first change its operation mode from the full BW (e.g., the 80 MHz) to an intermediate BW (e.g., 40 MHz), and then perform another change to change its operation mode from the intermediate BW to the minimum BW (e.g., 20 MHz). In another embodiment, the STA 101 may change its operation mode from the full BW directly to the minimum BW.

In one embodiment, during the downgrade of operation mode (i.e., downgrade initiated but before it is completed), the STA 101 may detect that there is data pending to be transmitted to the AP 102. In this situation, the STA 101 abandons the downgrade process and resumes its original operation mode, e.g., the active mode with full BW. In another embodiment, at block 204, when performing the downgrade of operation mode, the STA 101 does not send notification to the AP 102 to notify the AP 102 the change of the operation mode from the full BW to the minimum BW. In one example, the STA 101 does not send notification to the AP 102 to notify the AP 102 the change of the operation mode from the full BW to the intermediate BW, and from the intermediate BW to the minimum BW.

After the downgrade of operation mode is completed at block 204, the STA 101 enters the idle listening mode without notifying the AP 102. Since the AP 102 does not know that the STA 101 has entered the idle listening mode with the lower bandwidth, the AP 102 may still transmit data (e.g., management frames or data frames) to the STA 101 using the higher bandwidth.

In one embodiment, under IEEE 802.11 ac, the full BW is 80 MHz including four channels. Each of the four channels includes a 20 MHz channel (i.e., a channel with minimum BW). When the STA 101 operates in the idle listening mode, the STA senses only one of the four channels such as the primary 20 MHz channel of the four channels. In another embodiment, when the STA 101 operates in the idle listening mode, the STA may sense more than one of the four channels such as the primary 20 MHz channel and another 20 MHz channel of the four channels.

When the STA 101 operates in the idle listening mode with the lower bandwidth (e.g., the minimum BW), in one embodiment, the STA 101 detects an event indicating a need of using the higher bandwidth (e.g., the full BW) for transmitting data between the STA 101 and the AP 102. In one embodiment, the event is that the STA 101 receives a request to send (RTS) frame from the AP 102, as shown at block 205. For example, the AP 102 transmits the RTS frame using full BW (e.g., using all of the four 20 MHz channels) to the STA 101. However, since the STA 101 senses only one of the four channels such as the primary 20 MHz channel, the STA 101 receives the RTS only on the primary 20 MHz channel. If the STA 101 receives the RTS frame from the AP 102 at block 205, the process 200 proceeds to block 206.

After receiving the RTS frame from the AP 102 on the 20 MHz channel, the STA 101 does not transmit a clear to send (CTS) frame to the AP 102, as in conventional systems. Instead, in one embodiment, at block 206, the STA 101 may transmit one or more null frame with power management (PM) bit set to 1 to the AP 102 using the 20 MHz channel, such as the primary 20 MHz channel, sensed by the STA 101. The PM bit is a reserved bit defined in the IEEE 802.11ac standard. The null frames are also defined in the IEEE 802.11ac standard. The transmitted one or more null frames with PM bit set to 1 can be used to notify or interpreted by the AP 102 that the STA 101 starts to enter low power mode and then the AP 102 starts buffering data destined to the STA 101.

After transmitting the one or more null frame with PM bit set to 1 to the AP 102, in one embodiment, at block 207, the STA 101 performs upgrade of operation mode in response to receiving the RTS frame from the AP 102. For example, at block 207, the STA 101 performs the upgrade of its operation mode on PHY and RF from the idle listening mode with lower bandwidth (e.g., the minimum BW) to the active mode with higher bandwidth (e.g., the full BW). In another embodiment, at block 207, the STA 101 performs the upgrade of its operation mode on PHY and RF from the idle listening mode with minimum BW (e.g., 20 MHz) to the intermediate BW (e.g., 40 MHz), and then performs another change of its operation mode from the intermediate BW to the full BW (e.g., 80 MHz).

After the upgrade of operation mode is completed at block 207, at block 208, the STA 101 transmits another one or more null frame with PM set to 0 to the AP 102 using full BW. The transmitted one or more null frame with PM bit set to 0 can be used to notify or interpreted by the AP 102 that the STA 101 has exited the low power (idle listening) mode. Once the AP 102 receives the one or more null frames, the AP 102 may resume or start the process of sending buffered data to the STA 101 using full BW. And the STA 101 may receive the buffered data using full BW, as shown at block 209. When the AP 102 has finished transmitting all buffered data to the STA 101, the process 200 goes back from block 209 to block 201, where the STA 101 starts to sense the link activity with full BW and prepare to enter the idle listening mode again if condition is satisfied such as the inactive period is detected again.

On the other hand, if at block 205, the STA 101 does not receive the RTS from the AP at block 205, the process 200 proceeds from block 205 to block 210. At block 210, the STA 101 detects whether another event indicating a need of using the higher bandwidth (e.g., the full BW) for transmitting data between the STA 101 and the AP 102 occurred. In one embodiment, the another event is that the STA 101 detects that it needs to transmit data (management frames or data frames) to the AP 102 using the full BW (e.g., using all of the four 20 MHz channels), as shown at block 210. If the STA 101 does not detect that it needs to transmit data to the AP 102 using the full BW, the process 200 goes back to block 205 to continue to detect whether the STA 101 receives an RTS frame from the AP 102.

On the other hand, if at block 210, the STA 101 detects that it needs to transmit data to the AP 102 using the full BW, the process 200 proceeds to block 211. In response to detecting the need to transmit data to the AP 102 using the full BW, in one embodiment, at block 211, the STA 101 performs upgrade of operation mode. As described above, in one example, at block 211, the STA 101 performs the upgrade of its operation mode on PHY and RF from the idle listening mode with lower bandwidth (e.g., the minimum BW) to the active mode with higher bandwidth (e.g., the full BW). In another example, the STA 101 performs the upgrade of its operation mode on PHY and RF from the idle listening mode with minimum BW (e.g., 20 MHz) to the intermediate BW (e.g., 40 MHz), and then performs another change of its operation mode from the intermediate BW to the full BW (e.g., 80 MHz).

In one embodiment, when performing the upgrade of operation mode, the STA 101 does not send notification to the AP 102 to notify the AP 102 the change of the operation mode. After the upgrade of operation mode is completed at block 211, the STA 101 enters the active mode without notifying the AP 102. Since the AP 102 does not know that the STA 101 enters the idle listening mode from the initial active mode, and then reenters the active mode from the idle listening mode, the AP 102 may assume that the STA 101 is always in the active mode.

When the upgrade of operation mode is completed at block 211, at block 212, the STA 101 transmits data to the AP 102 using full BW (e.g., using all of the four 20 MHz channels). When the STA 101 has finished transmitting all data to the AP 102, the process 200 goes back from block 212 to block 201, where the STA 101 senses the BSS channel with full BW and prepare to enter the idle listening mode again if condition is satisfied such as the inactive period is detected again.

In one embodiment, in order to avoid that the STA 101 frequently switching its operation mode due to data to be transmitted to the AP 102, the data may be first buffered in a memory of the STA 101 until the data reaches a threshold before performing the upgrade of operation mode. For example, each time when the STA 101 detects data to be transmitted to the AP 102, the data can be first buffered in the memory of the STA 101. In the idle listening mode, the STA 101 may keep increasing the data buffered in the memory. The volume and/or delay requirement of the data are checked before the data is buffered. When the volume and/or delay requirement of the buffered data reaches a threshold, the STA 101 will stop data buffering and initiate the upgrade of operation mode. Buffered data is then transmitted to the AP 102 using full BW. In this way, buffer overflow or unexpected delay can also be avoided.

Figure 3:
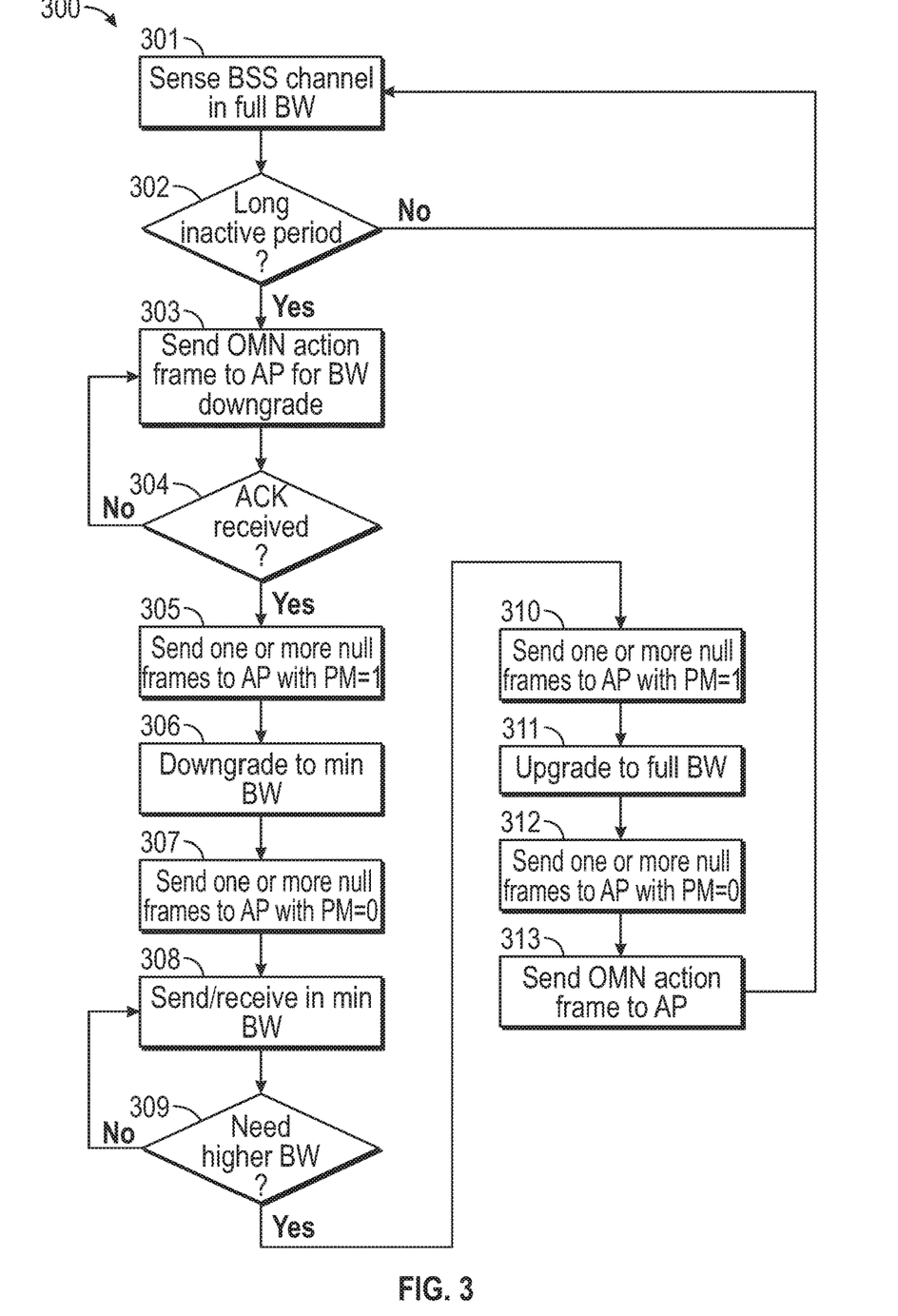
FIG. 3 illustrates an example process of a synchronous energy-efficient idle listening scheme, in accordance with some embodiments of the present disclosure.

FIG. 3 illustrates an example process 300 of a synchronous energy-efficient idle listening scheme, in accordance with some embodiments of the present disclosure. In the synchronous energy-efficient idle listening scheme, the AP 102 and the STA 101 can communicate data while operating in the same modes (i.e., synchronous modes). With the synchronous energy-efficient idle listening scheme, there may not be any mismatch between operation modes of the AP 102 and the STA 101 at any time.

As shown in FIG. 3, in one embodiment, at block 301, the STA 101 joins a basic service set (BSS), similarly as block 201 described above. The STA 101 can join the BSS with full BW. For example, under IEEE 802.11ac, the STA 101 can join the BSS and operate in an active mode with 80 MHz bandwidth. In one embodiment, the 80 MHz bandwidth may be divided into four channels, each having 20 MHz bandwidth.

At block 302, the STA 101 detects whether there was a long inactive period. Similarly, as block 202 described above, in one embodiment, the inactive period can be a predetermined time duration. In another example, the inactive period can be detected based on number or type of packets transmitted between the STA 101 and the AP 102. In one embodiment, if the STA 101 does not detect the inactive period, the process 300 goes back to block 301 where the STA 101 continues to sense the BSS in full BW. On the other hand, if the STA 101 detects the inactive period, the process 300 proceeds to block 303.

In one embodiment, at block 303, the STA 101 transmits a notification frame using full BW to the AP 102. The notification frame notifies the AP 102 that the STA 101 will perform a change of operation (i.e., downgrade of operation mode) from an active mode with a higher bandwidth (e.g., the full BW) to an idle listening mode with a lower bandwidth (e.g., the minimum BW) to save energy. In one embodiment, the notification frame is an operating mode notification (OMN) action frame, which is defined in the IEEE 802.11ac standard.

At block 304, the STA 101 detects whether an acknowledgment (ACK) signal is received from the AP 102. If the ACK signal is not received by the STA 101, the process 300 goes back to block 303 to retransmit the notification frame. If the ACK signal is received by the STA 101, the process 300 proceeds to block 305. At block 305, in one embodiment, the STA 101 transmits one or more null frames with PM bit set to 1 to the AP 102 using full bandwidth (e.g., using all the four 20 MHz channels in the 80 MHz bandwidth). The one or more null frames PM bit set to 1 can be used to notify the AP 102 to start buffering data destined to the STA 101.

At block 306, the STA 101 performs downgrade of operation mode. The STA 101 can perform downgrade of its operation mode on physical (PHY) layer and RF from the active mode with a higher bandwidth (e.g., the full BW) to an idle listening mode with a lower bandwidth (e.g., the minimum BW). For example, under IEEE 802.11ac, the STA 101 can change its operation mode from the active mode with 80 MHz to the idle listening mode with 20 MHz bandwidth.

In one embodiment, the STA 101 transmits a notification frame such as an OMN action frame using full BW to notify the AP 102 that the STA 101 will perform a change of operation from the full BW (e.g., 80 MHz) to an intermediate BW (e.g., 40 MHz). Then the STA 101 performs the change of operation from the full BW to the intermediate BW. After the STA 101 changes the operation from the full BW to the intermediate BW, the STA 101 transmits another notification frame using the intermediate BW to notify the AP 102 that the STA 101 will perform another change of operation from the intermediate BW to the minimum BM (e.g., 20 MHz). Then the STA 101 performs the change of operation from the intermediate BW to the minimum BW.

After the downgrade of operation mode is completed at block 306, the STA 101 enters the idle listening mode with a lower bandwidth (e.g., the minimum BW). In one embodiment, the STA 101 transmits one or more null frames with PM bit set to 0 to the AP 102 using minimum bandwidth (e.g., using the primary 20 MHz channel of the four 20 MHz channels), as shown at block 307. The one or more null frames with PM bit set to 0 can be used to notify the AP 102 that the STA 101 has entered the idle listening mode. By doing so, the AP 102 can fully acknowledge that the STA 101 has entered into the idle listening mode. Thus, the AP 102 may transmit data (e.g., management frames or data frames) to the STA 101 only using the minimum BW. Thus, the STA 101 can transmit and receive data only using the minimum BW, as shown at block 308.

In one embodiment, when the STA 101 operates in the idle listening mode, the STA senses only the channel in the minimum BW (e.g., the primary 20 MHz channel of the four 20 MHz channels in the 80 MHz bandwidth). In another embodiment, when the STA 101 operates in the idle listening mode, the STA 101 may sense more than one of the four channels such as the primary 20 MHz channel and another 20 MHz channel of the four channels.

When the STA 101 operates in the idle listening mode with the lower bandwidth (e.g., the minimum BW), the STA 101 keeps monitoring an event indicating a need of using the higher bandwidth (e.g., the full BW) for transmitting data between the STA 101 and the AP 102, as shown at block 309. In one embodiment, the event is that the AP 102 transmits an operating mode notification frame to the STA 101 in order to transmit data (management frames or data frames) using the full BW (e.g., using all of the four 20 MHz channels). For example, the AP 102 may try to reduce the amount of transmit data being buffered for the STA 101. And the STA 101 receives the operating mode notification frame only on the primary 20 MHz channel. In another embodiment, the event is that the STA 101 detects that it needs to transmit data (management frames or data frames) to the AP 102 using the full BW (e.g., using all of the four 20 MHz channels). If the STA 101 does not detect the event, the process goes back to block 308.

If the STA 101 detects the event, the process proceeds to block 310. At block 310, in response to the event, in one embodiment, the STA 101 transmits one or more null frames with PM bit set to 1 to the AP 102 using minimum bandwidth to notify the AP 102 that it will start the upgrade of operation mode. Then the STA 101 performs upgrade of operation mode in response to the event, as shown at block 311. For example, at block 311, the STA 101 performs the upgrade of its operation mode on PHY and RF from the idle listening mode with lower bandwidth (e.g., the minimum BW) to the active mode with higher bandwidth (e.g., the full BW). In another example, the STA 101 performs the upgrade of its operation mode on PHY and RF from the idle listening mode with minimum BW (e.g., 20 MHz) to the intermediate BW (e.g., 40 MHz), and then performs another change of its operation mode from the intermediate BW to the full BW (e.g., 80 MHz).

After the upgrade of operation mode is completed at block 311, at block 312, the STA 101 transmits another one or more null frames with PM set to 0 to the AP 102 using full BW. Then the STA 101 transmits another notification frame using full BW to the AP 102, as shown at block 313. The notification frame notifies the AP 102 that the STA 101 has exited the idle listening mode and entered the active mode. In one embodiment, the notification frame is an OMN action frame, which is defined in the IEEE 802.11ac standard.

After the AP 102 fully acknowledges that the STA 101 has entered into the active mode, the AP 102 may communicate data (e.g., management frames or data frames) with the STA 101 using the full BW. The process 300 goes back from block 313 to block 301, where the STA 101 starts to sense the link activity with full BW and prepare to enter the idle listening mode again if condition is satisfied such as the inactive period is detected again.

In one embodiment, the downgrade or upgrade of operation mode of the STA 101 as described with reference to FIG. 2 and FIG. 3 does not impact the links between the AP 102 and other STAs associated with the AP 102.

Figure 4:
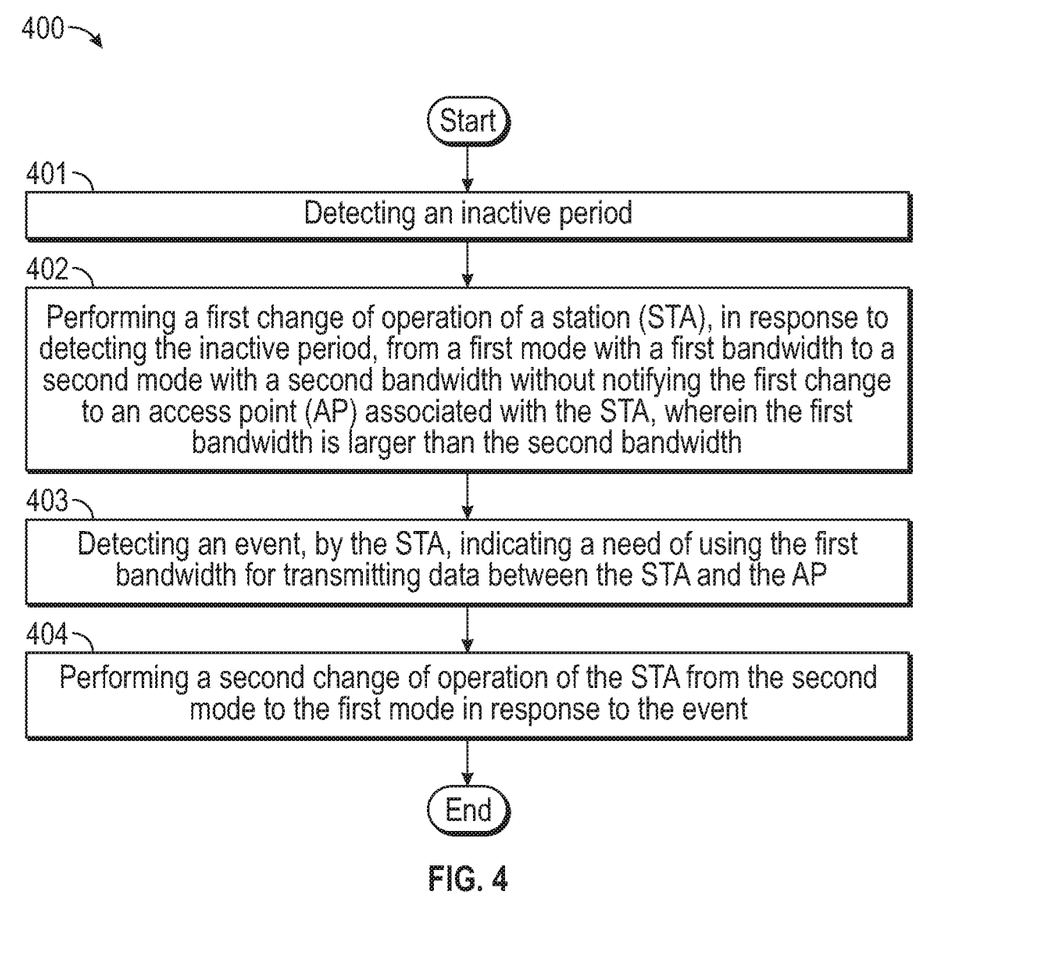
FIG. 4 illustrates a flow diagram of a method of an asynchronous energy-efficient idle listening scheme, in accordance with some embodiments of the present disclosure.

FIG. 4 is a flow diagram of a method 400 of an asynchronous energy-efficient idle listening enhancement, in accordance with some embodiments of the present disclosure. Method 400 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by the STA 101, or a processing device included in the STA 101 (e.g., processing device 602 illustrated in FIG. 6).

The method 400 begins at block 401, where the method 400 comprises detecting an inactive period. At block 402, the method 400 comprises performing a first change of operation of a STA, in response to detecting the inactive period, from a first mode with a first bandwidth to a second mode with a second bandwidth without notifying the first change to an AP associated with the STA, wherein the first bandwidth is larger than the second bandwidth. At block 403, the method 400 comprises detecting an event, by the STA, indicating a need of using the first bandwidth for transmitting data between the STA and the AP. At block 404, the method 400 comprises performing a second change of operation of the STA from the second mode to the first mode in response to the event.

Figure 5:
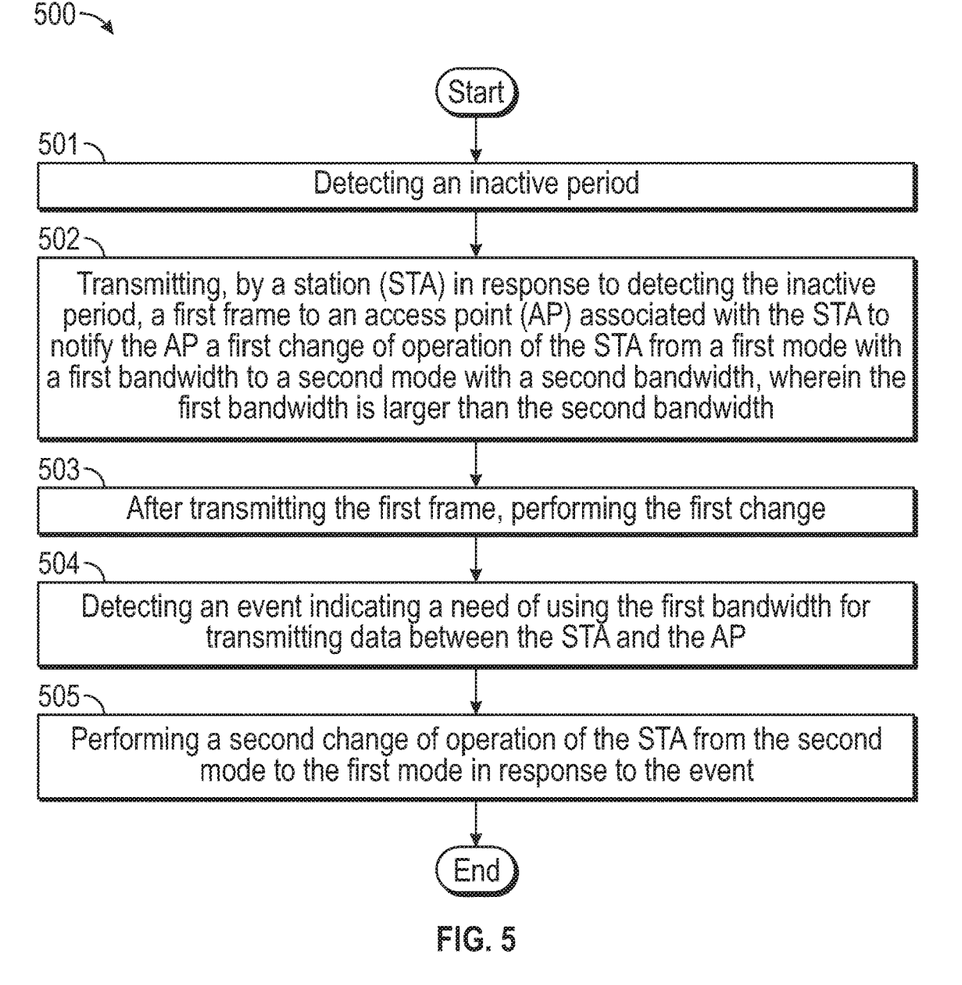
FIG. 5 illustrates a flow diagram of a method of a synchronous energy-efficient idle listening scheme, in accordance with some embodiments of the present disclosure.

FIG. 5 illustrates a flow diagram of a method 500 of a synchronous energy-efficient idle listening enhancement, in accordance with some embodiments of the present disclosure. Method 500 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 500 may be performed by the STA 101, or a processing device included in the STA 101 (e.g., processing device 602 illustrated in FIG. 6).

The method 500 begins at block 501, where the method 500 comprises detecting an inactive period. At block 502, the method 500 comprises transmitting, by an STA in response to detecting the inactive period, a first frame to an AP associated with the STA to notify the AP a first change of operation of the STA from a first mode with a first bandwidth to a second mode with a second bandwidth, wherein the first bandwidth is larger than the second bandwidth. At block 503, the method 500 comprises after transmitting the first frame, performing the first change. At block 504, the method 500 comprises detecting an event indicating a need of using the first bandwidth for transmitting data between the STA and the AP. At block 505, the method 500 comprises performing a second change of operation of the STA from the second mode to the first mode in response to the event.

In one embodiment, the asynchronous energy-efficient idle listening scheme and the synchronous energy-efficient idle listening scheme described above can be used for IEEE 802.11ac standard. In other embodiments, the asynchronous energy-efficient idle listening scheme and the synchronous energy-efficient idle listening scheme can be used for other WLAN standards where notification frame, e.g. OMN action frame, is not supported. In one embodiment, the asynchronous energy-efficient idle listening scheme and the synchronous energy-efficient idle listening scheme can be used in the 5 GHz frequency band. In other embodiments, the asynchronous energy-efficient idle listening scheme and the synchronous energy-efficient idle listening scheme can be used in other frequency bands such as the 2.4 GHz frequency band or the 6 GHz frequency band.

Figure 6:
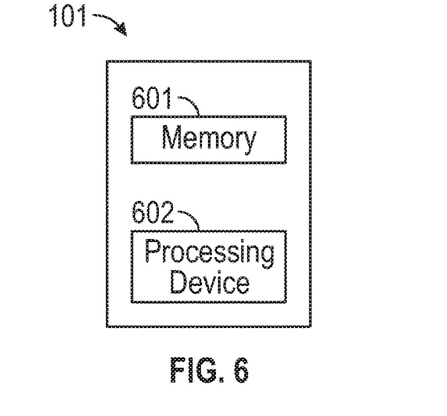
FIG. 6 is a block diagram of an example station (STA) that may perform one or more of the operations described herein, in accordance with some embodiments of the present disclosure.

FIG. 6 is a block diagram of an example STA 101 that may perform one or more of the operations described herein, in accordance with some embodiments. In one embodiment, the STA 101 includes a memory 601 and a processing device 602. The memory 601 may be synchronous dynamic random access memory (DRAM), read-only memory (ROM)), or other types of memory, which may be configured to store the generated accumulated packets and the CRC syndrome table, as described above. The processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

In other embodiments, the STA 101 may also include other components and/or devices not shown in FIG. 6. For example, the STA 101 may also include one or more antennas, analog-to-digital converter, demodulator/decoder and/or other components.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A station (STA) comprising:
a memory; and
a processing device for executing instructions stored on the memory, the instructions including:
   detecting an inactive period;
   in response to detecting the inactive period, transmitting a first frame to an access point (AP) associated with the STA to notify the AP of a first change of operation of the STA from a first mode with a first bandwidth to a second mode with a second bandwidth, wherein the first bandwidth is different than the second bandwidth;
   transmitting a second frame with a reserved bit having a first specified value using the first bandwidth to the AP before performing the first change;
   after transmitting the first frame, performing the first change;
   transmitting a third frame with the reserved bit having a second specified value to the AP using the second bandwidth after performing the first change;
   detecting an event indicating a need of using the first bandwidth for transmitting data between the STA and the AP; and
   performing a second change of operation of the STA from the second mode to the first mode in response to the event.

2. The STA of claim 1, wherein the first bandwidth includes a 40 MHz bandwidth or an 80 MHz bandwidth in a 5 GHz frequency band, and wherein the second bandwidth includes a 20 MHz bandwidth in the 5 GHz frequency band.

3. The STA of claim 1, wherein the first bandwidth includes a plurality of channels, and the second bandwidth includes at least one of the plurality of channels, and wherein detecting the event comprises:
   sensing only the at least one of the plurality of channels included in the second bandwidth; and
   receiving, by the STA, an operating mode notification (OMN) frame from the AP.

4. The STA of claim 1, wherein the first frame is an operating mode notification (OMN) action frame.

5. The STA of claim 1, wherein the reserved bit of the third frame is a power management (PM) bit.

6. The STA of claim 1, wherein performing the second change of operation includes changing operation of the STA from the second mode to a third mode, and then changing operation of the STA from the third mode to the first mode.

7. The STA of claim 1, wherein the instructions further include abandoning the first change if the event is detected before the first change is completed.

8. A wireless communication system comprising
an access point (AP); and
a station (STA) associated with the AP, the STA configured to:
   detect an inactive period;
   in response to detecting the inactive period, transmit a first frame to the AP to notify the AP of a first change of operation of the STA from a first mode with a first bandwidth to a second mode with a second bandwidth, wherein the first bandwidth is different than the second bandwidth;
   transmit a second frame with a reserved bit having a first specified value using the first bandwidth to the AP before performing the first change;
   after transmitting the first frame, perform the first change;
   transmit a third frame with the reserved bit having a second specified value to the AP using the second bandwidth after performing the first change;
   detect an event indicating a need of using the first bandwidth for transmitting data between the STA and the AP; and
   perform a second change of operation of the STA from the second mode to the first mode in response to the event.

9. The wireless communication system of claim 8, wherein the first bandwidth includes a 40 MHz bandwidth or an 80 MHz bandwidth in a 5 GHz frequency band, and wherein the second bandwidth includes a 20 MHz bandwidth in the 5 GHz frequency band.

10. The wireless communication system of claim 8, wherein the first bandwidth includes a plurality of channels, and the second bandwidth includes at least one of the plurality of channels, and wherein detecting the event comprises:
   sensing only the at least one of the plurality of channels included in the second bandwidth; and receiving, by the STA, an operating mode notification (OMN) frame from the AP.

11. The wireless communication system of claim 8, wherein the first frame is an operating mode notification (OMN) action frame.

12. The wireless communication system of claim 8, wherein the reserved bit of the third frame is a power management (PM) bit.

13. The wireless communication system of claim 8, wherein performing the second change of operation includes changing operation of the STA from the second mode to a third mode, and then changing operation of the STA from the third mode to the first mode.

14. The wireless communication system of claim 8, wherein the instructions further include abandoning the first change if the event is detected before the first change is completed.

15. A method comprising:
    detecting an inactive period;
    in response to detecting the inactive period, transmitting a first frame to the AP to notify the AP of a first change of operation of the STA from a first mode with a first bandwidth to a second mode with a second bandwidth, wherein the first bandwidth is different than the second bandwidth;
    transmitting a second frame with a reserved bit having a first specified value using the first bandwidth to the AP before performing the first change;
    after transmitting the first frame, performing the first change;
    transmitting a third frame with the reserved bit having a second specified value to the AP using the second bandwidth after performing the first change;
    detecting an event indicating a need of using the first bandwidth for transmitting data between the STA and the AP; and
    perform a second change of operation of the STA from the second mode to the first mode in response to the event.

16. The method of claim 15, wherein the first bandwidth includes a 40 MHz bandwidth or an 80 MHz bandwidth in a 5 GHz frequency band, and wherein the second bandwidth includes a 20 MHz bandwidth in the 5 GHz frequency band.

17. The method of claim 15, wherein the first bandwidth includes a plurality of channels, and the second bandwidth includes at least one of the plurality of channels, and wherein detecting the event comprises:
    sensing only the at least one of the plurality of channels included in the second bandwidth; and
    receiving, by the STA, an operating mode notification (OMN) frame from the AP.

18. The method of claim 15, wherein the first frame is an operating mode notification (OMN) action frame.

19. The method of claim 15, wherein the reserved bit of the third frame is a power management (PM) bit.

20. The method of claim 15, wherein performing the second change of operation includes changing operation of the STA from the second mode to a third mode, and then changing operation of the STA from the third mode to the first mode.

* * * * *